US012779450B2

(12) United States Patent
Biller et al.

(10) Patent No.: US 12,779,450 B2
(45) Date of Patent: Nov. 3, 2026

(54) MOBILE MEDIA SUPPLY DEVICE

(71) Applicant: HOHENLOHER SCHULEINRICHTUNGEN GMBH & CO. KG, Öhringen (DE)

(72) Inventors: Alexander Biller, Karlsruhe (DE); Vanessa Birkert, Wüstenrot (DE); Dierk Suhr, St. Michaelisdonn (DE); Albert Jaud, Heilbronn (DE); Peter Reinold, Öhringen (DE); Dirk Jägers, Esslingen (DE)

(73) Assignee: HOHENLOHER SCHULEINRICHTUNGEN GMBH & CO. KG, Öhringen (DE)

( * ) Notice: Subject to any disclaimer, the term of this patent is extended or adjusted under 35 U.S.C. 154(b) by 135 days.

(21) Appl. No.: 18/861,316

(22) PCT Filed: Apr. 24, 2023

(86) PCT No.: PCT/EP2023/060619
§ 371 (c)(1),
(2) Date: Oct. 29, 2024

(87) PCT Pub. No.: WO2023/213591
PCT Pub. Date: Nov. 9, 2023

(65) Prior Publication Data

US 2025/0288985 A1 Sep. 18, 2025

(30) Foreign Application Priority Data

May 2, 2022 (DE) ..................... 10 2022 110 632.2
May 2, 2022 (DE) ..................... 20 2022 002 751.6

(51) Int. Cl.
*B01L 1/00* (2006.01)
*B01L 3/00* (2006.01)
(Continued)

(52) U.S. Cl.
CPC *B01L 1/52* (2019.08); *B01L 3/56* (2013.01); *B67D 7/0288* (2013.01); *B67D 7/845* (2013.01);
(Continued)

(58) Field of Classification Search
CPC ........ B01L 1/52; B01L 3/56; B01L 2200/026; B67D 7/0288; B67D 7/845
See application file for complete search history.

(56) References Cited

U.S. PATENT DOCUMENTS

2006/0163829 A1 7/2006 Livengood et al.

FOREIGN PATENT DOCUMENTS

DE 10065375 B4 1/2011
DE 202012100949 U1 8/2012
(Continued)

OTHER PUBLICATIONS

International Search Report issued on Jul. 5, 2023, in corresponding International Application No. PCT/EP2023/060619; 5 pages.
(Continued)

*Primary Examiner* — Jennifer C Chiang
(74) *Attorney, Agent, or Firm* — Maier & Maier, PLLC

(57) ABSTRACT

A mobile media supply device for providing a workstation with at least one technical medium, including: (i) a body mounted on wheels, which houses a media store for a technical medium, (ii) at least one media withdrawal connection (iii) a media blocking device which in a first state enables the withdrawal of the technical medium from the media withdrawal connection and in a second state prevents the withdrawal, (iv) a mobility blocking device for blocking the mobility of the mobile media supply device, and (v) a control device, which is arranged to change the state of the media blocking device and further to block the mobility of the mobile media supply device by the mobility blocking
(Continued)

device. At least one release device to be actuated by a person is provided.

18 Claims, 7 Drawing Sheets

(51) Int. Cl.
*B67D 7/02* (2010.01)
*B67D 7/84* (2010.01)

(52) U.S. Cl.
CPC ..... *B01L 2200/18* (2013.01); *B01L 2300/021* (2013.01)

(56) References Cited

FOREIGN PATENT DOCUMENTS

| | | | | | |
|---|---|---|---|---|---|
| DE | 102018111170 | A1 | | 11/2019 | |
| DE | 102019005014 | A1 | | 1/2021 | |
| EP | 2878372 | A1 | | 6/2015 | |
| GB | 2279589 | A | | 1/1995 | |
| KR | 20090091204 | A | * | 8/2009 | ............... H04L 9/40 |

OTHER PUBLICATIONS

Examination Report issued on Dec. 19, 2022, in corresponding German Patent Application No. 10 2022 110 632.2, 11 pages.

* cited by examiner

MOBILE MEDIA SUPPLY DEVICE

TECHNICAL FIELD

The present invention relates to a mobile media supply device for the accessible, selective supply of at least one workstation, in particular a school or laboratory workstation, with at least one technical medium.

BACKGROUND

The requirements on modern laboratories as well as science teaching rooms in schools have increased significantly in recent years and are nowadays determined by a. o. the following factors: accessibility, flexibility of the media supply, modularity, adaptability to modified tasks and equipment features and low provision costs through the efficient use of room height and laboratory space.

Due to these factors, which must not be understood exhaustively, concepts have been developed, which enable school and laboratory workstations to be supplied with laboratory media without floor connections from above. A supply from above via the ceiling has numerous advantages. It means that on the one hand the floor area of the laboratory remains free from media connections, so that, in order to optimise workflows, the school and laboratory workstations and the other fixtures and fittings normally required in the classroom and laboratory can be locally changed at any time. On the other hand, a media supply via the ceiling also allows the spatial layout to be easily subsequently adapted to changed lab conditions, if for example an inorganic laboratory is be changed into a biochemical or physical laboratory. All this is possible without significantly interfering with the school room or lab room and the laboratory building.

As regards the withdrawal of laboratory media provided via the ceiling one has to differentiate basically between two systems. On the one hand there are route-based media supply systems, which for example are also called media wings, and which permit the media supply of laboratory workstations linearly arranged along the route. Selective supply systems belong into the second category. Such systems merely supply one workstation or a group of e.g. two or three adjacent workstations, which are confined to a small area, with laboratory media. But there are also combinations of route-shaped and selective media supply systems.

Selective supply systems are generally known, which are attached to the story ceiling or perhaps to a suspended ceiling. Such selective supply systems have withdrawal fittings, which are either located at a determined height below the ceiling (e.g. media columns) or withdrawal fittings which are height-adjustable. With height-adjustable systems known from the art lowering of the media fittings may be accomplished in various ways. There are systems, which lower the media connections and again raise them when not in use, via a scissor linkage, a telescopic slide or via a joint, which permits a swivel movement about a horizontal axis. In this context reference is made to EP 2 367 248 A2 and EP 1 916 749 B1.

DE 10 2014 100 526 A1 discloses a mobile device for handling dangerous materials. This device includes a safety cabinet for storing dangerous materials as well as a facility, in which the dangerous material is analysed. The safety cabinet and the analysis equipment such as a chromatograph are connected with each other via connection lines.

DE 10 2006 055 000 A1 discloses a device for providing a medium at a work table, which includes a receiving space for storing the medium as well as appropriate fittings for dispensing the medium.

In EP 3 114 740 B1 a media supply is disclosed, which can be mounted in the area of the ceiling. That section of the media supply, in which the media withdrawal connections/fittings are provided, can be moved telescopically and also three-dimensionally in the space via different swivel axes, so that one or more workstations can be selectively provided in the space with technical media, such as pressurised air, current, gas.

In DE 10 2018 111 170 A1 a mobile media supply is described, which comprises a cube-shaped basic body, the surface of which is set back in an area, in which the media withdrawal connection is provided. Due to the set-back arrangement of the media withdrawal connection this is protected against damage when being moved through small openings such as doors.

GB 2 069 915 A1 discloses a movable laboratory workstation, which provides various connections for technical laboratory media to the laboratory assistant. This laboratory workstation also has a water tap with associated water catchment trough.

DE 38 34 544 A1 describes a stationary work table for a laboratory or a workshop for example, which comprises a rack with a worktop arranged thereon, which worktop, in the rearward area, has joined to it a height-adjustable table arrangement with depositing surfaces, shelf spaces and working tools. The table structure with its upper edge can be lowered at least approximately as far down as the level of the worktop.

DE 20 2005 001 261 U1 describes a stationary media supply system for providing at least one medium to at least one workstation. The supply system includes a body releasably attached to the floor of the room. Inside the body extend media lines, which are connected to connection fittings provided in the floor.

The disadvantage of the above-described media supply systems consists in that high investment cost are incurred during provision of the media supply, that comparatively large school rooms and laboratories are required in those cases, in which provision of the media is from the ceiling, and that if not all media shall be catered for, there will not be sufficient flexibility as regards a change in laboratory activity in an existing school room or lab room.

SUMMARY

It is therefore an objective of the invention to provide a media supply, which ensures a flexible media supply at a workstation in for example a classroom or a lab room. In particular it is an object of the invention to propose a flexible mobile media supply, which can be used independently of spatial circumstances practically without danger at a variety of workstations, for example in different lab rooms or school rooms, which in addition will satisfy stringent safety requirements.

According to the invention a mobile media supply device is provided for the accessible selective supply of at least one workstation, in particular a school or laboratory workstation, with at least one technical medium. The mobile media supply device comprises (i) a body mounted on wheels, which defines a cavity, in which at least one media store for a technical medium is received, (ii) at least one media withdrawal connection, which is connected to a media store, (iii) a media blocking device, which is arranged between the media store and the media withdrawal connection and in the first state enables the withdrawal of the technical medium from the media withdrawal connection and in the second state prevents the withdrawal of the technical medium from the media withdrawal connection, (iv) a mobility blocking device 120 for blocking the mobility of the mobile supply device and (v) a control device, which is arranged to change the state of the media blocking device and further to block the mobility of the mobile media supply device by means of the mobility blocking device. The mobile media supply device is characterised in that at least one release device to be actuated by a person is provided, which is connected to the control device, and in that the control device is arranged such that when the release device is actuated, the control device is prompted to block the mobility of the mobile media supply device by means of the mobility blocking device depending on the state of the media blocking device automatically and without the aid of the person.

Preferably the control device is arranged such that during actuation of the release device the control device is prompted to block the mobility of the mobile media supply device by means of the mobility blocking device and to place the media blocking device into the first state.

Further preferably the control device is arranged such that during actuation of the release device the control device is prompted to unblock the mobility of the mobile media supply device by means of the mobility blocking device and to place the media blocking device into the second state.

Still more preferably the release device is contactlessly actuated.

Preferably the release device is an RFID reader.

Optionally the mobility blocking device has a mobility release device and the media store has a media release device assigned to it.

It is advantageous if the control device is arranged such that during actuation of the media release device the control device is prompted to block the mobility of the mobile media supply device by means of the mobility blocking device, before the media blocking device is placed into the first state.

Furthermore, it is of advantage if the control device is arranged such that during actuation of the mobility blocking device the control device is prompted to place the media blocking device into the second state before the mobility of the mobile media supply device is released by the mobility blocking device.

Preferably the control device is a micro-controller, which in the de-energised state places the media blocking device into the second state.

The media blocking device is preferably a gas fitting and/or an electric socket.

Optionally the mobile media supply device further comprises a level gauge for measuring the filling level of the media store.

Preferably the media store is an electric accumulator with a capacity within the range of 500-5000 kWh and/or a liquid gas store with a volume within the range of 400-1000 ml.

Preferably the media withdrawal connection is a gas fitting and/or an electric socket.

Further preferably the media withdrawal connection is provided on a media withdrawal body, wherein an inductive charging device is provided on an upper surface of the media withdrawal body such that a charging area of the inductive charging device corresponds to the surface of the media withdrawal body.

Even more preferably the mobile media supply device further comprises at least one wired charging connection, with the aid of which a media store implemented as an electric accumulator can be recharged.

It is of advantage if the mobility blocking device is a blocking device, which blocks at least one wheel of the body.

Preferably the blocking device is a blocking device driven by an electric motor, which prevents a translatory and rotatory movement of the wheel of the body.

It is also of advantage if the mobile media supply device further comprises an emergency stop device, wherein the control device is arranged such that during actuation of the emergency stop device the media blocking device is placed into the second state.

SHORT DESCRIPTION OF THE DRAWINGS

The invention will now be described purely by way of example with reference to the attached figures, which show various embodiments of the present invention, and in which FIG. 1 shows a perspective view of a mobile media supply device according to a preferred embodiment of the invention;

The figures are merely schematic representations and merely serve to explain and better understand the invention. Equivalent or functionally equivalent elements are always marked with the same reference symbols.

DETAILED DESCRIPTION

The mobile media supply device described hereunder serves the purpose of providing certain technical media such as for example current and gas there, where they happened to be needed, without the need of having to change, extend or and even re-route the position of any media-conducting lines. The mobile media supply device thus represents a media source independent of a media supply installed or provided in the building, and which provides the media which may be needed for at least a certain amount of time. It is therefore of special importance anywhere where certain media are needed, but are not normally available. This may for example be a workstation such as in an office or a workstation in a school or a laboratory.

Preferred embodiments of the mobile media supply device mainly differ from each other as regards the type of provided medium and the media lines required for it. The outer shape and basic functionality of the mobile media supply device remain in the main unaffected by it, as will be obvious from the description hereunder.

Figure 1:
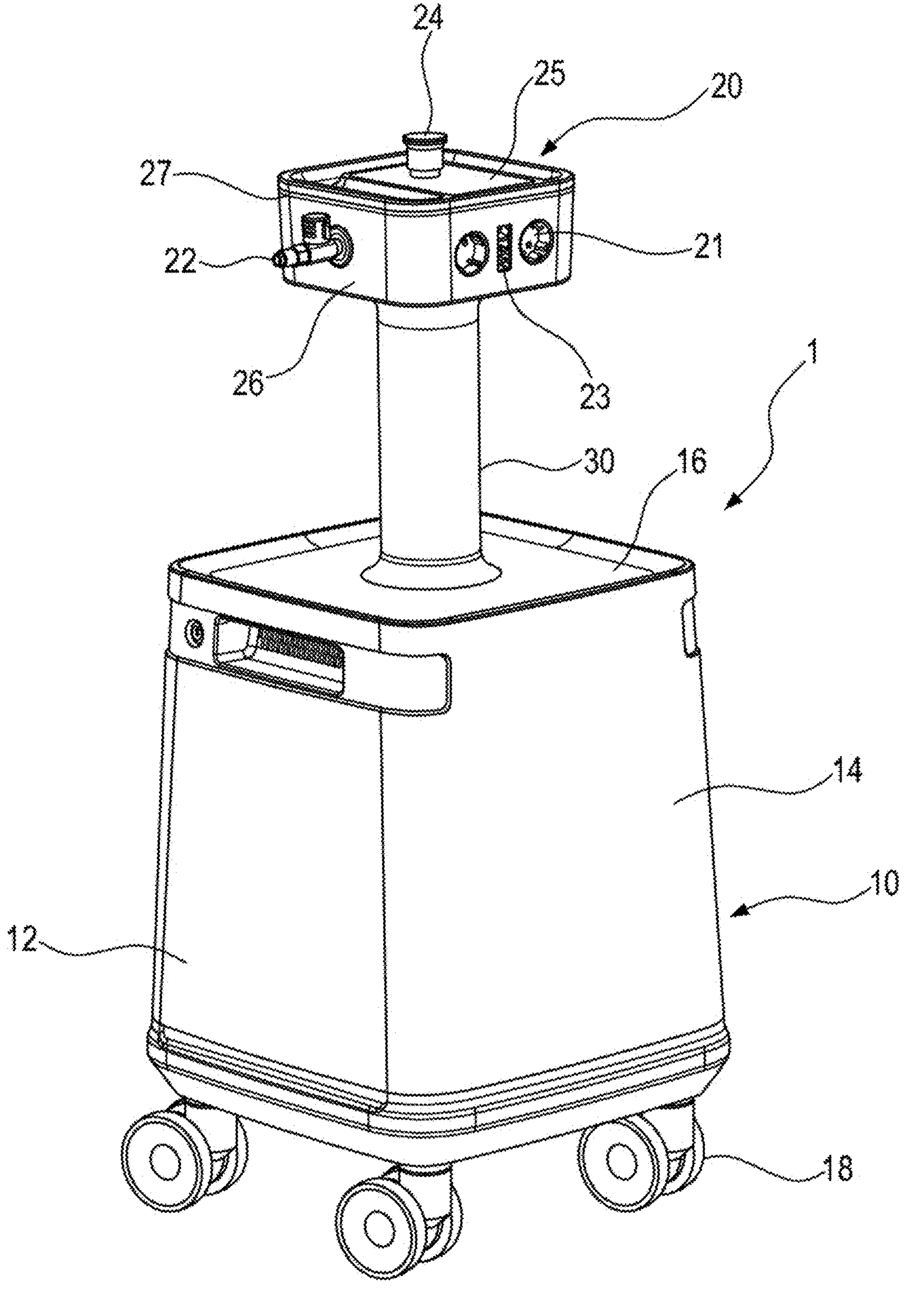

FIG. 1 shows a preferred embodiment of the mobile media supply device 1. The mobile media supply device 1 preferably includes a basic body 10, which is designed for receiving at least one media store. The basic body 10 has preferably an elongated shape in vertical direction. The cross-sectional shape perpendicular to the vertical is preferably almost square, wherein the cross-sectional area of the basic body 10 extending perpendicularly to the vertical direction decreases as its height increases. Due to the almost square cross-sectional shape the basic body 10 preferably comprises four side areas, the vertically extending edges of which are preferably rounded.

The basic body 10 defines a cavity 11 (FIG. 2), which is accessible via a revision opening 12, such as a removable flap or a hinged door, through which the respectively needed media store 40, 60 (FIG. 2 and FIG. 4) can be brought into the basic body 10 and from which it can again be removed when it must be replaced. The cavity 11 of the basic body 10 may also at least partially be closed/covered via side walls 14 firmly fixed to be basic body 10.

The basic body 10 is dimensioned such that an accumulator 60 with a capacity within a range of 500-5000 kWh and/or a liquid gas cartridge 40 with a volume within a range from 400-1000 ml can be received therein. It is also feasible for a pressurised air container with a volume in a range from 400-600 ml to be received inside the basic body 10.

The basic body 10 is mounted on rollers/wheels 18, which are preferably rotatable, so that tight movement radii can be accomplished with the mobile media supply device 1.

An intermediate body 30, which is preferably shaped cylindrically, preferably extends from an upper surface 16 of the basic body 10. The intermediate body 30 in turn is preferably joined in vertical direction to a media withdrawal body 20.

The media withdrawal body 20 is preferably square-shaped and comprises an upper surface 25 as well as four side surfaces 26. The vertically extending edges of the media withdrawal body 20 are also preferably rounded.

At least one media withdrawal connection 21, 22 is provided on the side walls 26 of the media withdrawal body 20. As regards the embodiment shown in FIG. 1 the media withdrawal connection 21 is an electrical socket such as a socket 21. In FIG. 1 a socket strip is shown, which has two sockets 21 usable separately from each other. In terms of the invention it is also possible to provide merely one socket 21 or alternatively more than two on a side wall 26 of the media withdrawal body 20. Optionally or additionally one or more of the remaining four side walls 26 may have a further media withdrawal connection such as a gas fitting 22.

A light strip 27 is preferably provided on the media withdrawal body 20, which lights up at a point in time, when a control 100 (FIG. 7) of the mobile media supply device 1 has authorised the release of a technical medium such as gas or current.

At this point it should be pointed out that the basic body 10, the intermediate body 30 and the media withdrawal body 20 may also be combined to form one body. A breakdown into three different bodies is merely preferred, but in no way necessary for realising the invention.

In terms of the invention the mobile media supply device 1 may provide only one technical medium or also a number of different technical media. As such it is feasible that the mobile media supply device 1 provides for example only current or only gas or only pressurised air, or only current and pressurised air or only current and gas, or only pressurised air and gas, or current and gas and pressurised air.

In addition to the media withdrawal connections 21, 22 at least one USB charging connection and/or at least one LAN connection marked with the reference symbol 23 in FIG. 1 may be optionally provided on the media withdrawal body 20. Using the USB charging connection an electrically operated device connected thereto may be supplied with current, which is made available by the accumulator 60 housed inside the basic body 10.

Preferably an emergency stop 24 is also provided on the upper surface 25, which in an emergency may be pressed by an operator in order to stop the gas supply from the liquid gas cartridge 40 to the gas fitting 22 and/or the current supply from the accumulator 60 to the electric sockets 21. Preferably the emergency stop 24 may be designed as an emergency stop switch which deactivates all functions of the mobile media supply device 1.

Release devices 90*a*, 90*b*, 90*c* (FIG. 5) are preferably provided on the upper surface 25 of the media withdrawal body 20, which during activation enable the function assigned to them such as current withdrawal at the sockets 21 and/or gas withdrawal at the gas fitting 22. Optionally an inductive charging device (not shown) for a smartphone or tablet for example may in addition be provided on the upper surface 25 of the media withdrawal body 20. The inductive charging device is arranged such that a charging area of the inductive charging device corresponds to the upper surface 25 of the media withdrawal body 20.

It can also be recognised in FIG. 1 that a cross-sectional area $A_{Zwischenkorpus}$ is smaller than the cross-sectional areas $A_{Medienkorpus}$ and $A_{Grundkorpus}$. In other words, $A_{Zwischenkorpus}$ is completely contained in $A_{Medienkorpus}$ and $A_{Grundkorpus}$. Therefore no aspect of the external surface of the media withdrawal body 20 extends laterally beyond the basic body 10, and no aspect of the external surface of the intermediate body 30 extends laterally beyond the media withdrawal body 20 and the basic body 10. In addition a cross-sectional area $A_{Medienkorpus}$ of the media withdrawal body 20 extending perpendicularly to the vertical direction is completely contained in a cross-sectional area $A_{Grundkorpus}$ of the basic body 10. Due to the special styling of the mobile media supply device 1, in particular due to the fact that as regards the cross-sectional area ratios the following applies:

$$A_{Zwischenkorpus} < A_{Medienkorpus} < A_{Grundkorpus},$$

rectangular or square tables, which preferably have bevelled corners, can be placed together in such a way that the mobile media supply device 1 can be arranged centrally between all tables and is easily accessible from all tables. This is of advantage in particular in school classrooms, where media are not available in all rooms and several pupils are to perform the same experiment, for which the same media are required by all pupils of this table group. Due to the fact that the above cross-sectional area ratios apply and smaller cross-sectional areas are completely contained in respectively larger cross-sectional areas, the mobile media supply can be moved even by inattentive pupils or other personnel without risk from one room to another room through narrow doors without there being a danger of damage to the media withdrawal connections and an inadvertent leakage of a medium such as gas.

Figure 2:
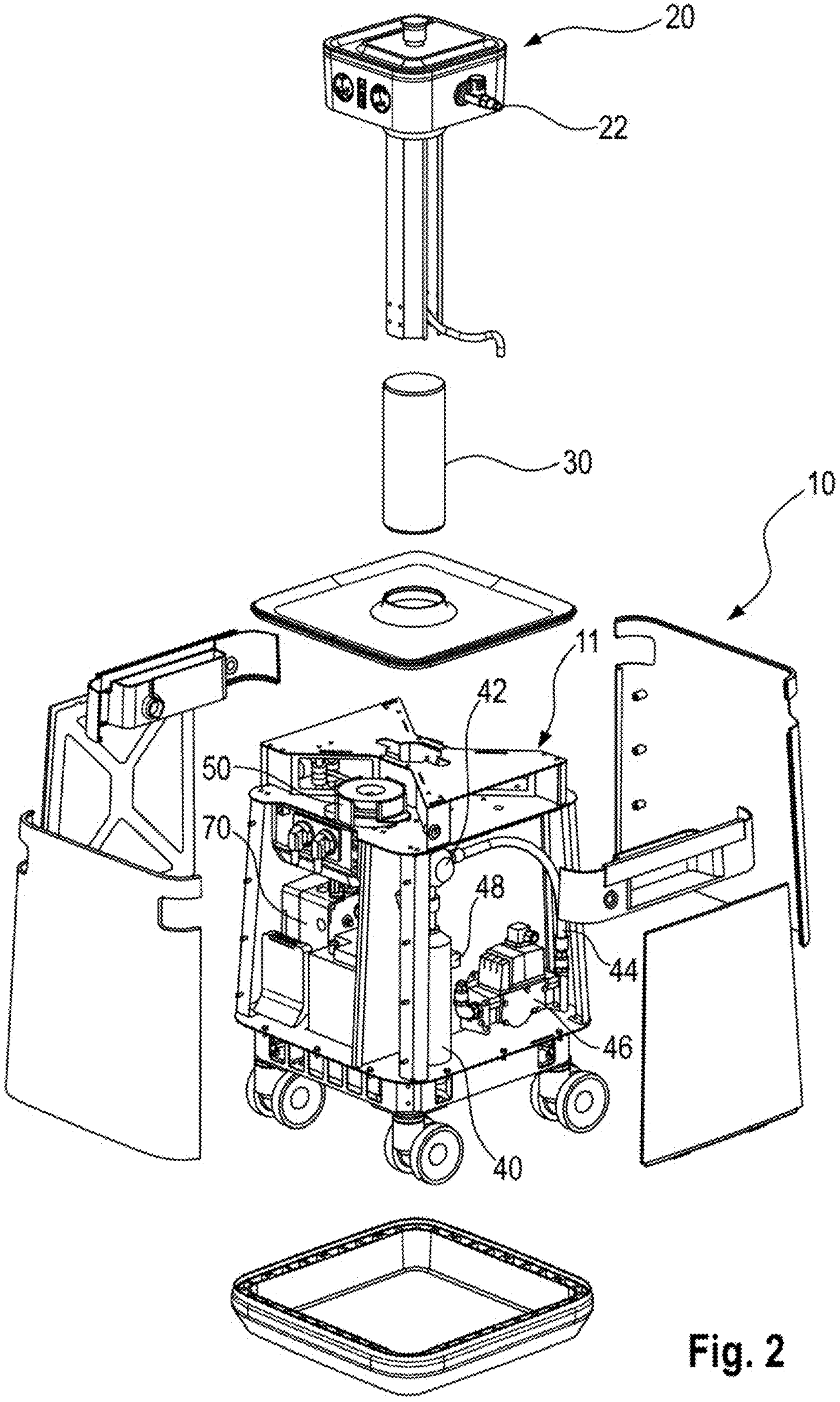
FIG. 2 shows a perspective exploded view of a first side of the mobile media supply device shown in FIG. 1.

FIG. 2 shows an exploded view of the mobile media supply device 1 shown in FIG. 1. In FIG. 2 the media stores 40, 60 received in the cavity 22 of the basic body 10 can be seen. Gas is made available by a liquid gas cartridge 40 received in the basic body 10 and connected via a pressure reducer 42 and a gas pipe 44 to a gas safety technology module 46. A level gauge 48 is provided for measuring the filling level of the liquid gas cartridge 40. A gas pipe not shown in FIG. 2 leads from the gas safety technology module 46 to the gas fitting 22 provided on the media withdrawal body 20. The gas safety technology module 46 ensures that during activation of the release device 90*a* responsible for the gas, gas can flow from the liquid gas cartridge 40 to the gas fitting 22. To this end the gas safety technology module 46 is activated via a control device 100 shown only in FIG. 7 and preferably implemented as a micro-controller, and connected to a blocking device 72, which is preferably implemented as a switch, more preferably as a relay, and which is housed in the connection module marked with the reference symbol 70. When the state of the blocking device 72 is changed by the control device 100, the gas flow through the respective gas pipe to the gas fitting 22 is enabled. In other words, in a first state of the blocking device 72 gas withdrawal is enabled by the gas fitting 22 and a second state gas withdrawal is prevented by the gas fitting 22.

Figure 3:
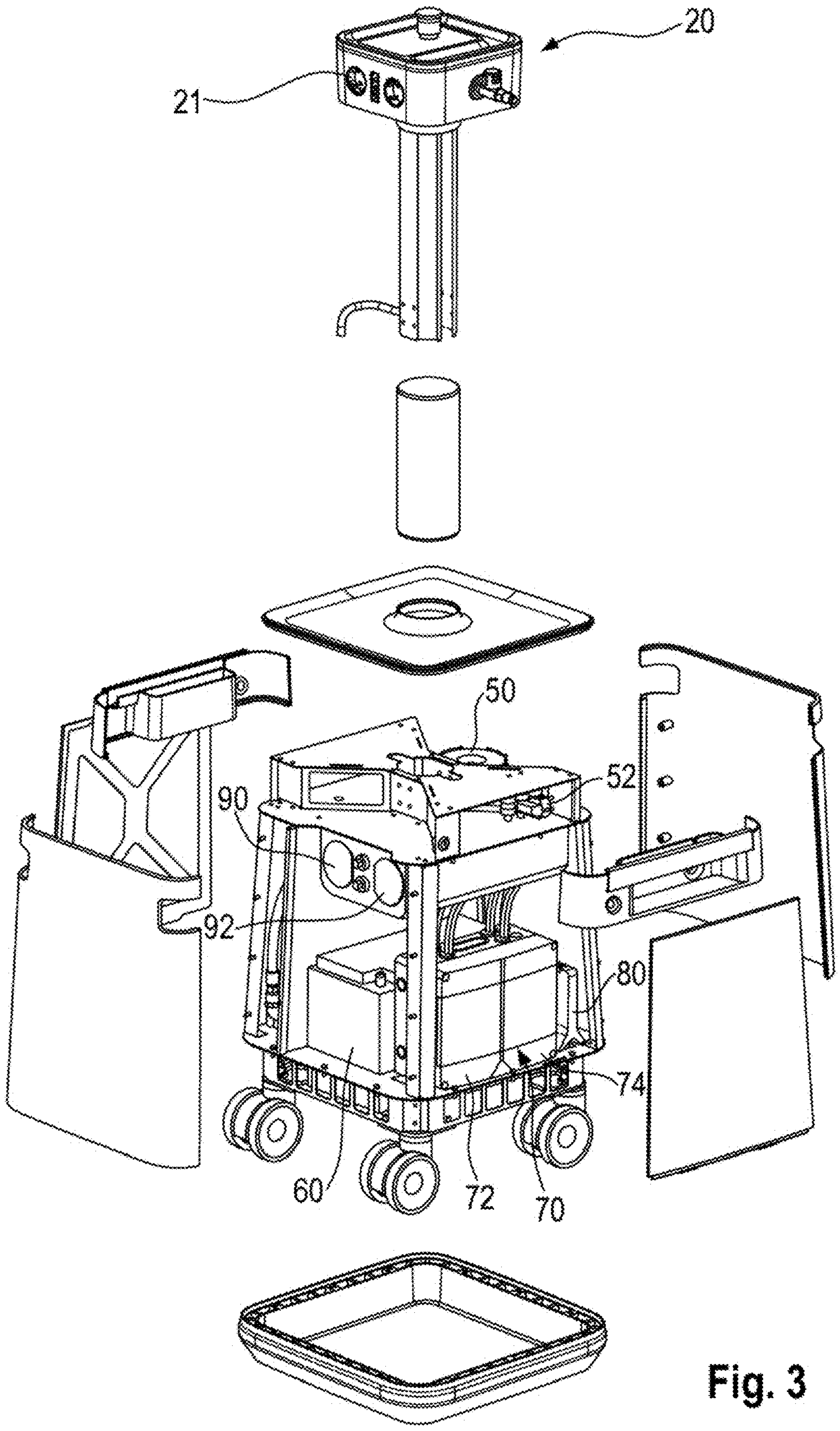
FIG. 3 shows a perspective exploded view of a second side of the mobile media supply device shown in FIG. 1.

FIG. 3 shows a further exploded view of the mobile media supply device 1 shown in FIG. 1, but seen from another side than in the view of the mobile media supply device 1 shown in FIG. 2.

Figure 4:
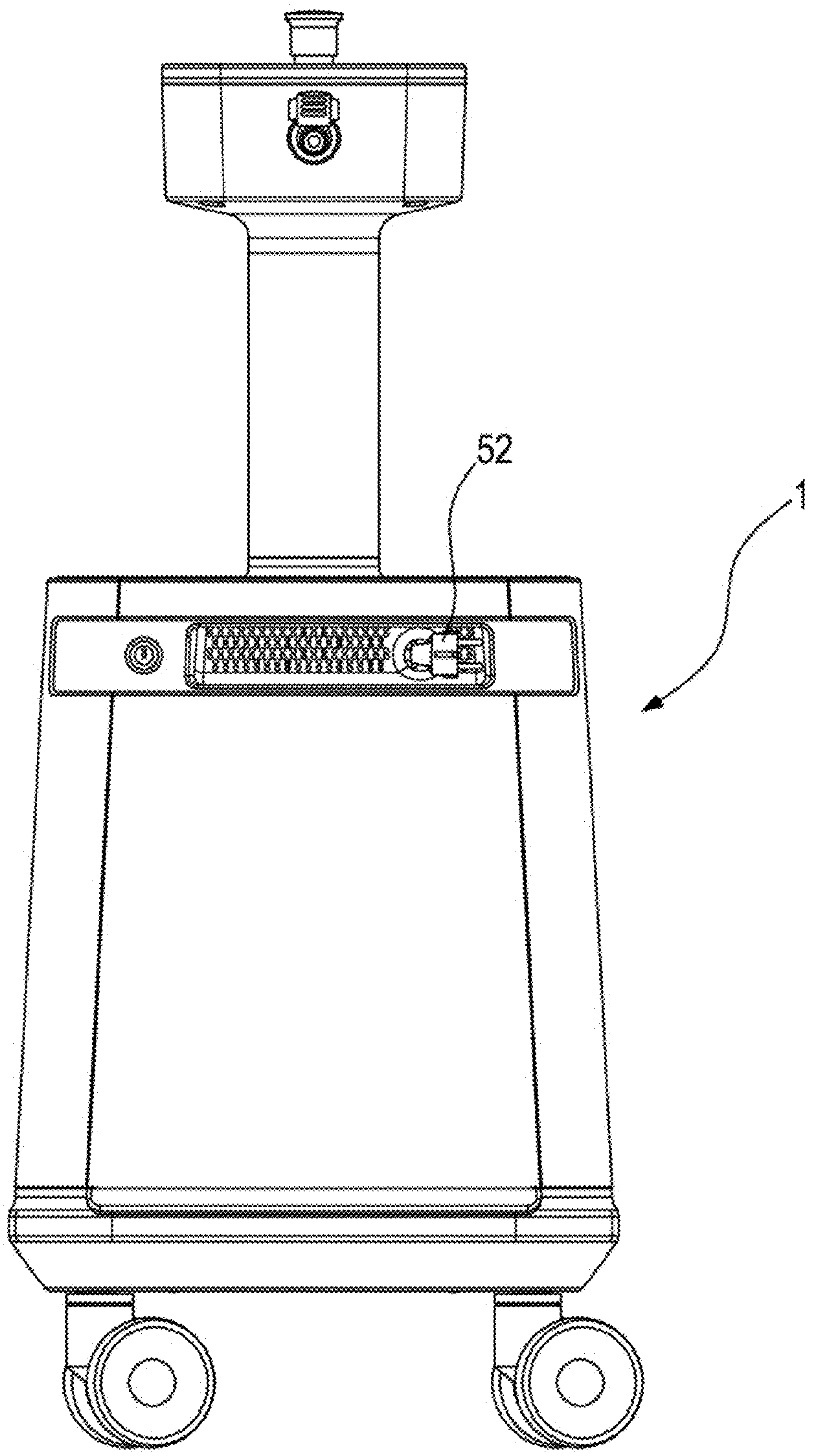
FIG. 4 shows a side view of the mobile media supply device shown in FIG. 1.

In FIG. 3 an accumulator 60 is shown, which is connected on the one hand via a power cable not shown with the electric sockets 21 provided on the media withdrawal body 20 and on the other hand with the charging cable 52. The charging cable 52, the plug of which is shown in FIG. 4, is wound onto a take-up reel 50. To charge the accumulator 60 the charging cable 52 must merely be pulled out of the take-up reel 50 and connected to an external socket. An inverter 90 ensures that the direct current provided by the accumulator 60 is changed into alternating current, which can then be withdrawn at the electric socket 21. Equally the alternating current withdrawn by the charging cable 62 from an external AC current network may be converted by the inverter 90 into direct current for charging the accumulator 60. The inverter 90 is further preferably equipped with a state-of-charge meter 92, which measures the charge state of the accumulator.

The connection module 70 also houses a blocking device 74, which is preferably designed as a switch, more preferably as a relay. The blocking device 73 is activated by a control device 100, which is preferably implemented as a micro-controller. When the state of the blocking device 74 is changed by the control device 100, the current flow from the accumulator 60 through a respective current power line to the electric current is enabled. In other words, in a first state of the blocking device 74 current withdrawal is enabled by the electric socket 21 and in a second state current withdrawal is prevented by the electric socket 21.

Further FIG. 3 shows a router 80, which e.g. may connect a plurality of internet-capable devices (laptop, tablet) with the internet in a mobile manner. This is for example of advantage, if the mobile media supply device 1 shall be used outside of a school by pupils, who then gain access to the internet with the aid of their tablets.

Depending on the number and type of the media stores 40, 60 arranged inside the basic body 10 the number of blocking devices 72, 74 also varies. The blocking devices 72, 74 are arranged between the respective media store 40, 60 and the respective media withdrawal connection 21, 22 and can be switched from a first state into a second state with the aid of the control device. In a first state of the blocking device 72, 74 a media withdrawal from the media withdrawal connection is enabled, whilst in a second state of the blocking device 72, 74 media withdrawal is prevented. The control device 100, which is preferably implemented as a micro controller and is appropriately programmed, thus controls various functions of the mobile media supply device 1. Details of the control will be explained further below with reference to FIG. 7.

Figure 5:
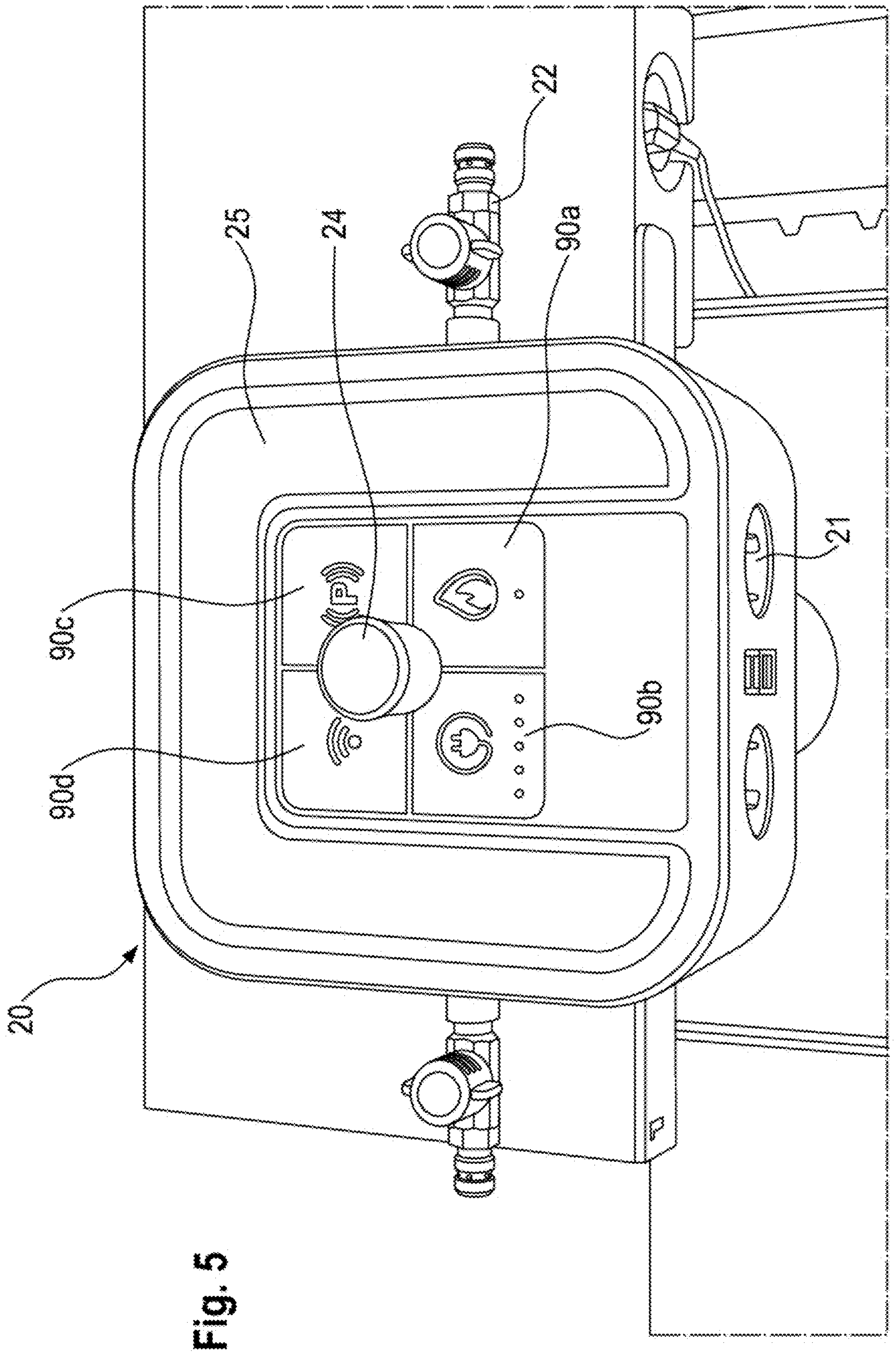
FIG. 5 shows a top view of the mobile media supply device shown in FIG. 1.

FIG. 5 shows a top view of the mobile media supply device 1, in particular a top view onto the media withdrawal body 20. In FIG. 5 can be seen the electric sockets 21 and the gas fittings 22 as well as the release devices **90*a*, 90*b* and 90*c* provided on the upper surface 25 of the media withdrawal body 20. Furthermore a WIFI (WLAN) release device 90*d* can be seen. An emergency switch-off device 24 is also shown in FIG. 5**.

The release devices **90*a*, 90*b*, 90*c* are preferably contactless release devices, and more preferably RFID readers. The release devices 90*a*, 90*b*, 90*c* can be operated/actuated in that the user holds an RFID chip into the effective area of the RFID readers 90*a*, 90*b*, 90*c*, as a result of which the data stored on the RFID chip are read by the RFID readers and these then forward a signal to the control device 100. A separate release device 90*a*, 90*b*, 90*c* is provided for each technical medium, for example current and gas. For example, the release device 90*a* serves the release of gas, the release device 90*b* serves the release of current and the release device 90*c* serves the release of mobility of the mobile media supply device 1. When operating a release device 90*a*, 90*b*, 90*c*, the symbol provided on the release device 90*a*, 90*b*, 90*c* appears in a certain colour, which is indicative for the released function, such as the medium to be withdrawn. The gas release device 90*a* preferably appears in blue, the current release device 90*b* preferably appears in red and the wheel release device 90*c*** preferably appears in green.

Figure 6:
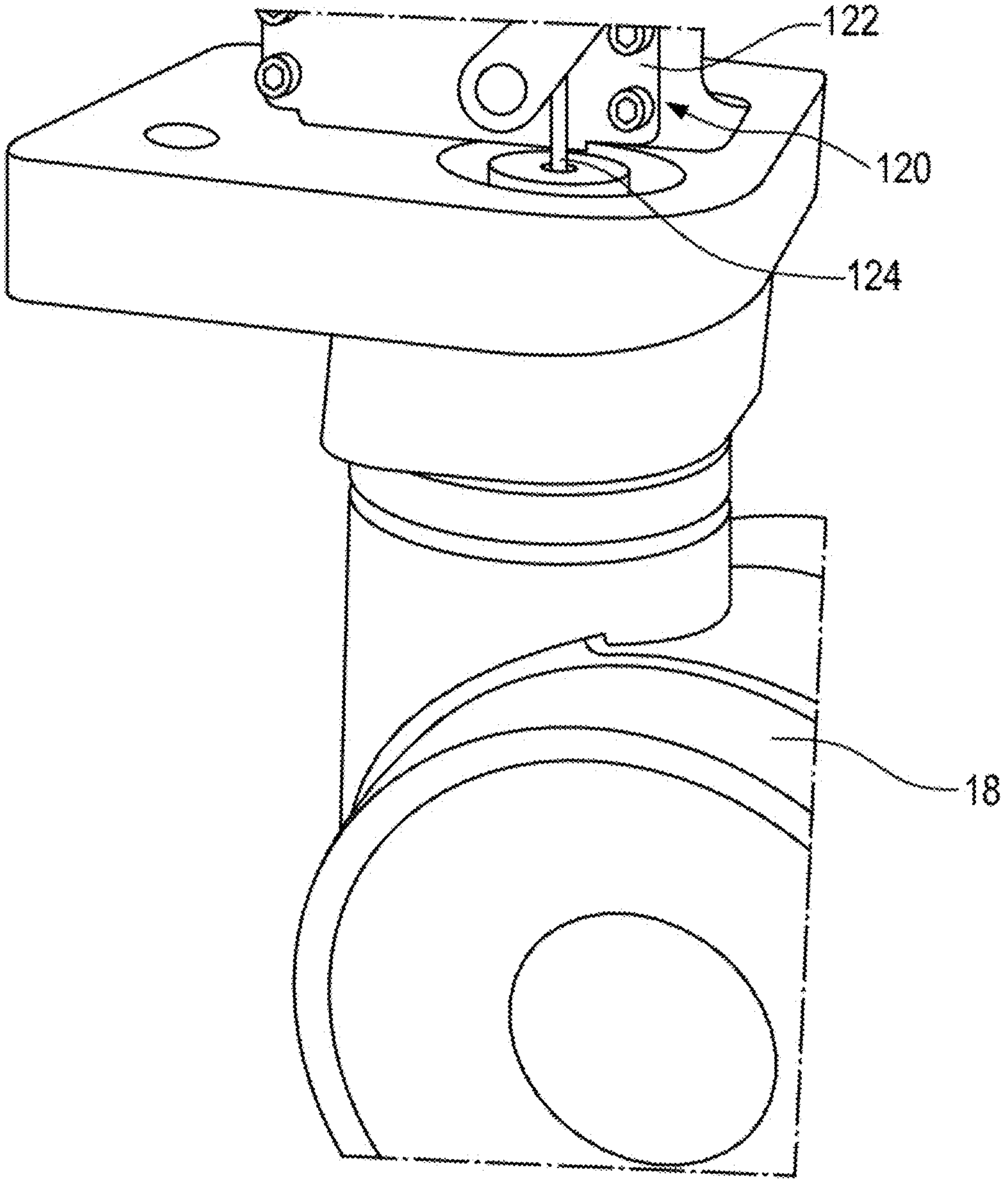
FIG. 6 shows a detailed view of a wheel with associated blocking device.

FIG. 6 shows a wheel 18 as well as a mobility blocking device 120. The mobility blocking device 120 serves to prevent the mobility, i.e. the movability of the mobile media supply device 1. In the example shown in FIG. 6 the mobility blocking device is implemented as a blocking device 120, which can block the wheel 18. To this end a step motor 122 is provided, which moves a pin not shown, which in turn prevents a translatory and, as applicable, rotatory movement of the wheel 18. Blocking of the wheel 18 may also be effected by differently designed blocking devices 120, such as for example mechanical, hydraulic or pneumatic brakes. In terms of the invention merely one wheel 18 of the basic body 10 may comprise a blocking device 120. But it is also possible that all four wheels 18 (or just two wheels 18 mounted on an axis) are blocked by means of one or more blocking devices 120. Actuation of the blocking device 120 is performed by the control device 100.

The mobility of the mobile media supply device 1 may also be prevented in other ways. For example, it is feasible instead of blocking one or more wheels 18, to block the entire mobile media supply device 1 by jacking it up on automatically extendible supports provided on the basic body 10, so that the mobility of the mobile media supply device 1 is prevented.

Figure 7:
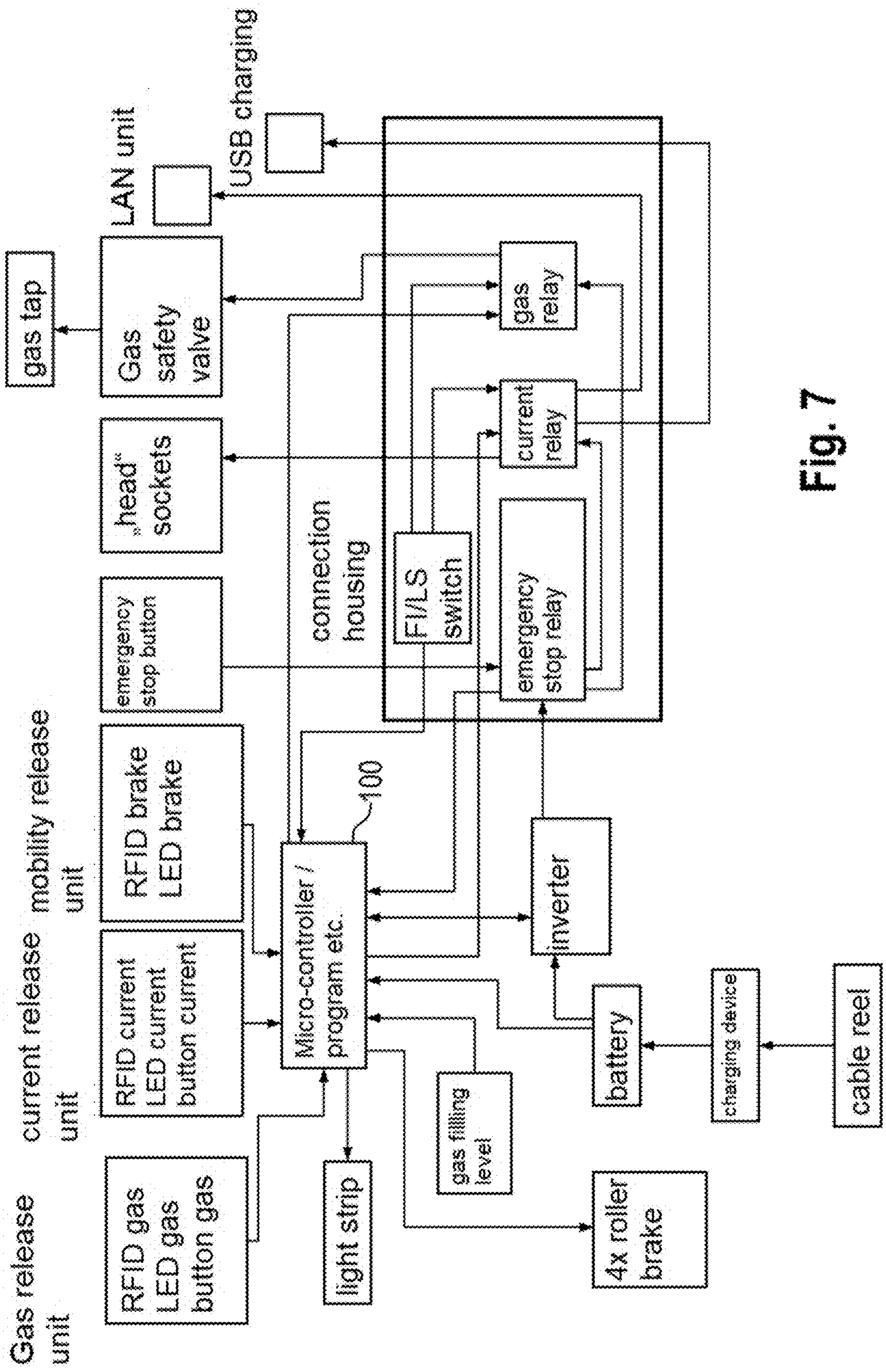
FIG. 7 shows a circuit diagram of the mobile media supply device shown in FIG. 1.

Various functions will now be explained with reference to FIG. 7, which are implemented in the mobile media supply device 1. These are also found in the table below:

| Components | 1. Standby + on charging device | 2. Check current filling level | 3. Disconnect charging device |
|---|---|---|---|
| Gas release unit | No indication | No indication | No indication |
| Current release | Indicates charge level | 1. “press” current | No indication |

-continued

| Components | 1. Standby + on charging device | 2. Check current filling level | 3. Disconnect charging device |
|---|---|---|---|
| unit | | release<br>3. LED "current" indicates charge status | |
| Mobility release unit | Signals state of mobility | Signals state of mobility | Signals state of mobility |
| Gas filling level | Not active | Not active | Not active |
| Micro-controller | Active, 2. checks battery voltage via system supply voltage | Active, 2. checks battery voltage via system supply voltage | Active, 2. Determines that there is no current flow between charging device and battery |
| Light strip | Signals charge level by pulsating | Signals charge level by pulsating | 2. Indicates standby |
| Roller brake | Released or blocked | Released or blocked | Released or blocked |
| Charging device | Is connected to 230 V, charges the battery | Is connected to 230 V, charges the battery | 1. Is unplugged, charging operation finished |
| Battery | Is being charged | 2. Battery voltage is checked by micro-controller | 2. Is not being charged |
| Inverter | Is switched off | Is switched off | Is switched off |
| Button for emergency stop (incl. relay) | Operated or not operated | Operated or not operated | Operated or not operated |
| Insulation monitor FI/LS | Not active | Not active | Not active |
| Gas relay | Closed | Closed | Closed |
| Gas safety valve | Not active | Not active | Not active |
| Withdrawal point head (gas tap) | Not defined | Not defined | Not defined |
| Current relay | Not active | Not active | Not active |
| Sockets (head) | Not active | Not active | Not active |
| Lan unit | Not active | Not active | Not active |
| USB charging circuit | Not active | Not active | Not active |

| Components | 4. Release Mobility | 5. Release current | 6. Release gas |
|---|---|---|---|
| Gas release unit | No indication | No indication | 1. Present RFID, –> Feedback via LED + filling level indication in case of release |
| Current release unit | No indication | 1. Present RFID, –><br>3. Feedback via LED + filling level indication in case of release | No indication |
| Mobility release unit | 1. Present RFID<br>4. Signals mobility release | 3. Signals blocking of mobility | Signals blocking of mobility |
| Gas filling level | Not active | Not active | 3. Is queried |
| Micro-controller | 2. Checks justification of RFID if ok –> If yes, the current and gas relays are blocked, and the inverter is switched off, the roller brakes are released, and feedback is given at the release unit | 2. Checks justification of RFID, if ok–> 3. Block rollers, switch on inverter, switch current relay, check battery level and feedback to input unit and light strip | 2. Checks justification of RFID, if ok–> 3. Block rollers, switch gas relay, check filling level, feedback to input unit and light strip |
| Light strip | 2. Indicates Standby | 3. Signals media release | 3. Signals media release |
| Roller brake | 3. Released | 3. Blocked | Blocked |
| Charging device | Not active | Not active | Not active |
| Battery | Is being discharged | 3. Battery voltage is checked by micro-controller, is being discharged | Is being discharged |
| Inverter | Is switched off | 3. Is switched on | Is switched on |
| Button for | Actuated or not actuated | 0 not actuated | Not actuated |

-continued

| Components | 4. Release Mobility | 5. Release current | 6. Release gas |
|---|---|---|---|
| emergency stop (incl. relais) | | | |
| Insulation monitor, FI/LS | Not active | 3. active | active |
| Gas relay | Closed | Closed | 3. Open |
| Gas safety valve | Not active | Not active | 3. active |
| Withdrawal point head (gas tap) | Not defined | Not defined | 3. active |
| Current relay | Not active | 3. active | active |
| Sockets (head) | Not active | 3. active | active |
| Lan unit | Not active | 3. active | active |
| USB charge circuit | Not active | 3. active | active |

| Components | 7. Release mobility | 8. Deactivate mobility | 9. Reconnect charge plug |
|---|---|---|---|
| Gas release unit | No indication | No indication | No indication |
| Current release unit | No indication | No indication | Indicates charge level |
| Mobility release unit | 1. Present RFID 3. Signals release of mobility | 1. Present RFID/ operate button Signals blocked mobility | Signals state of mobility |
| Gas filling level | 3. Not active | Not active | Not active |
| Micro-controller | 2. Checks justification of the RFID if ok -> 3. Current and gas relay blocked, and inverter switched off, roller brakes released, and feedback given at the release unit | 2. Checks justification of the RFID/whether button has been operated, if ok -> 3. Rollers are blocked and feedback given at the release unit | Active, 2. Checks battery voltage via system supply voltage |
| Licht strip | 3. Signals standby | Signals standby | Signals charge state by pulsating |
| Roller brake | 3. is being released | 3. Blocked | Blocked |
| Charging device | Not active | Not active | Is connected to 230 V, charges the battery |
| Battery | Is being discharged | Is being discharged | Is being charged |
| Inverter | 3. Is switched off | Is disconnected | Is disconnected |
| Button for emergency stop (inc. Relais) | Not actuated | Not actuated | Not actuated |
| Insulation monitor, FI/LS | 3. No longer active | Not active | Not active |
| Gas relay | 3. Closed | Closed | Closed |
| Gas safety valve | 3. Not active | Not active | Not active |
| Withdrawal point head (Gas tap) | Not defined | Not defined | Not defined |
| Current relay | 3. Not active | Not active | Not active |
| Sockets (head) | 3. Not active | Not active | Not active |
| Lan unit | 3. Not active | Not active | Not active |
| USB charge circuit | 3. Not active | Not active | Not active |

If for example an RFID chip is held into the effective area of the RFID reader 90*a* responsible for gas, justification of the RFID chip is first checked by the control device (e.g. micro-controller) 100. Then the control device 100 checks (not mandatory), as to whether the filling level of the liquid gas cartridge 40 is sufficient, i.e. lies above a predetermined threshold value. If the RFID chip justification is ok and the gas filling level in the liquid gas cartridge 40 as applicable is sufficient, the control device 100 sends a signal to the blocking device 72 (e.g. switch, relay, opto-coupler) and switches it into a state, in which the blocking device 72 releases the gas flow from the liquid gas cartridge 40 to the gas fittings 22. Preferably the control device 100, prior to releasing the gas flow, sends a signal to the mobility blocking device 120, which ensures that at the point in time, at which the gas flow is released, the media supply device 1 is no longer mobile, in that preferably one wheel 18, more preferably all wheels 18 are blocked. The light strip 27 signals the release of gas in a respective colour.

Analogously thereto current is released, when an RFID chip is presented to the release device 90*b*. Here too, justification of the RFID chip is initially checked. If the result of this check is positive, the mobility blocking device 120 is initially activated with the aid of a signal of the control device 100. Subsequently the inverter 90 is switched on, the charging level of the accumulator 60 is checked and if the charging level is sufficient, the blocking device 74 is placed into a state, in which the current flow can flow from the accumulator 60 to the electric socket 21. The release of current is indicated via the light strip 27 in the respective colour. Should the state of the accumulator (battery) not be sufficient, the release process is aborted and the mobility of the media supply device 1 restored, whereby the media supply device 1 can be moved to an external socket in order to enable to accumulator 60 to be again recharged by means of the charging cable 52.

While the accumulator 40 is being charged with the aid of the charging cable 52, mobility of the media supply device is again blocked. This is done in that a signal is sent from the inverter 90 to the control device 100 as soon as the charging cable 52 is connected to an external socket. The control device 100 then sends a signal to the mobility blocking device 120, which then ensures that the mobility of the media supply device 1 is blocked, in that for example at least one wheel 18 is blocked.

Release of the mobility, for example release of a blocked wheel 18, is again done by presenting an RFID chip to the release device 90*c*. Here too justification of the RFID chip is initially checked. If the check yields a positive result, the inverter 90 is disconnected and the blocking devices 72, 74 for current and gas are switched into a state, in which there can be no more withdrawal of current from the electric socket and no more withdrawal of gas from the gas fitting 22. It is not until thereafter that mobility of the media supply device 1 is again restored, in that the control device 100 sends a respective signal to the mobility blocking device 120. If mobility shall then again be blocked, the RFID chip is again presented to the release device 90*c*.

In case of an unforeseen emergency the operator can press the emergency stop 24 and immediately prevent the release of gas and current. This is done in that the emergency stop 24 sends a signal to the control device 100, which in turn places the blocking devices 72, 74 into a state, in which gas can no longer flow from the liquid gas cartridge 40 to the gas fittings 22, and current can flow no longer from the accumulator 60 to the electric sockets 21.

In all embodiments the connecting elements for the connection of the media withdrawal connections 21, 22 with the respective media store, such as connecting sleeves and screws as well as possibly necessary valves and manometer displays are not shown in the figures.

Also, in all embodiments displays may be provided on the basic body 10, the intermediate body 30 or even on the media withdrawal body 20, which respectively show the filling level of the respective media store 40, 60.

Due to the functions listed in the table above the safety of a mobile media supply device is ensured, since only authorised persons can perform the release of media, and blocking of the mobility is always effective when a technical medium is withdrawn and the media supply device is not in a proper condition. By using a liquid gas cartridge, the use of several of such mobile media supply devices in a classroom is allowed according to the legal regulations in Germany, which in case of a gas bottle would not be the case, since in Germany the law will only allow one gas bottle per classroom.

The invention claimed is:

1. A mobile media supply device (1) for the accessible selective supply of at least one workstation, in particular a school or laboratory workstation, with at least one technical medium, including:

(i) a body (10) mounted on wheels (18), which defines a cavity (11), in which at least one media store (40, 60) for a technical medium is received, (ii) at least one media withdrawal connection (21, 22), which is connected to the media store (40, 60), (iii) a media blocking device (72, 74), which is arranged between the media store (40, 60) and the media withdrawal connection (21, 22) and in a first state enables the withdrawal of the technical medium from the media withdrawal connection (21, 22) and in a second state prevents the withdrawal of the technical medium from the media withdrawal connection (21, 22), (iv) a mobility blocking device (120) for blocking the mobility of the media supply device (1), and (v) a control device (100), which is arranged to change the state of the media blocking device (72, 74) and further to block the mobility of media supply device (1) by means of the mobility blocking device (120), characterised in that at least one release device (90*a*, 90*b*, 90*c*) to be actuated by a person is provided, which is connected to the control device (100), and in that, when the release device (90*a*, 90*b*, 90*c*) is actuated, the control device (100) is arranged such that the control device (100) is prompted to block the mobility of the media supply device (1) by means of the mobility blocking device (120) depending on the state of the media blocking device (72, 74) automatically and without the aid of the person.

2. The mobile media supply device (1) according to claim 1, wherein the control device (100) is arranged such that, when the release device (90*a*, 90*b*, 90*c*) is actuated, the control device (100) is prompted to block the mobility of the media supply device (1) by means of the mobility blocking device (120) and to place the media blocking device (72, 74) into the first state.

3. The mobile media supply device (1) according to claim 1, wherein the control device (100) is arranged such that, when the release device (90*a*, 90*b*, 90*c*) is actuated, the control device (100) is prompted to release the mobility of the media supply device (1) by means of the media blocking device (120) and to place the media blocking device (72, 74) into the second state.

4. The mobile media supply device (1) according to claim 1, wherein the release device (90*a*, 90*b*, 90*c*) can be contactlessly actuated.

5. The mobile media supply device (1) according to claim 1, wherein the release device (90*a*, 90*b*, 90*c*) is an RFID reader.

6. The mobile media supply device (1) according to claim 1, wherein the mobility blocking device (120) is assigned to a mobility release device (90*c*) and a media release device (90*a*, 90*b*) is assigned to the media store (40, 60).

7. The mobile media supply device (1) according to claim 6, wherein the control device (100) is arranged such that, when the media release device (90*a*, 90*b*) is actuated, the control device (100) is prompted to block the mobility of the media supply device (1) by means of the mobility blocking device (120), before the media blocking device (72, 74) is placed into the first state.

8. The mobile media supply device (1) according to claim 6, wherein the control device (100) is arranged such that, when the mobility release device (90*c*) is actuated, the control device (100) is prompted to place the media blocking device (72, 74) into the second state, before the mobility of the media supply device (1) is released by means of the mobility blocking device (120).

9. The mobile media supply device (1) according to claim 1, wherein the control device is a micro-controller (100), which in the de-energised state places the media blocking device (72, 74) into the second state.

10. The mobile media supply device (1) according to claim 1, wherein the media blocking device is an electric relay (72, 74).

11. The mobile media supply device (1) according to claim 1, further including a level gauge (48, 92) for measuring the filling level of the media store (40, 60).

12. The mobile media supply device (1) according to claim 1, wherein the media store is an electric accumulator (60) with a capacity within a range of 500-5000 kWh and/or a liquid gas store (40) with a volume within a range of 400-1000 ml.

13. The mobile media supply device (1) according to claim 1, wherein the media withdrawal connection is a gas fitting (22) and/or an electric socket (21).

14. The mobile media supply device (1) according to claim 1, wherein the media withdrawal connection (21, 22) is provided on a media withdrawal body (20) and wherein an inductive charging device is provided on an upper surface (25) of the media withdrawal body (20) such that a charging area of the inductive charging device corresponds to the surface (25) of the media withdrawal body (20).

15. The mobile media supply device (1) according to claim 1, further including at least one wired charging connection (52), with the aid of which a media store implemented as an electric accumulator (60) can be recharged.

16. The mobile media supply device (1) according to claim 1, wherein the mobile blocking device is a blocking device (120), which blocks at least one wheel (18) of the body (10).

17. The mobile media supply device (1) according to claim 16, wherein the blocking device (120) is a blocking device (122, 124) driven by an electric motor, which prevents a translatory and rotatory movement of the wheel (18) of the body (10).

18. The mobile media supply device (1) according to claim 1, further comprising an emergency stop device (24), wherein the control device (100) is arranged such that when the emergency stop device (24) is actuated, the media blocking device (72, 74) is placed into the second state.

* * * * *